Dec. 7, 1965   C. M. BROWNE   3,222,153
METHOD OF PRODUCING MULTIPLE SHEET GLAZING UNITS
Original Filed Jan. 10, 1955

INVENTOR.
Charles M. Browne
BY
Nobbe & Swope
ATTORNEYS

United States Patent Office 3,222,153
Patented Dec. 7, 1965

3,222,153
METHOD OF PRODUCING MULTIPLE SHEET GLAZING UNITS
Charles M. Browne, Toledo, Ohio, assignor to Libbey-Owens-Ford Glass Company, Toledo, Ohio, a corporation of Ohio
Original application Jan. 10, 1955, Ser. No. 480,759. Divided and this application Oct. 4, 1960, Ser. No. 65,557
3 Claims. (Cl. 65—43)

This application is a division of copending application Serial No. 480,759, filed January 10, 1955, now abandoned.

This invention relates to glazing units which are made up of two or more sheets or plates of glass joined together entirely around their marginal edges. More particularly, it relates to an improved method of fabricating such units.

Multiple sheet glazing units may be described generally as comprising two or more spaced sheets of glass which are sealed together entirely around their marginal edge portions to enclose hermeticaly sealed dead air spaces therebetween. Due principally to their insulating and condensation preventing qualities, such units have become well established fixtures in the building trades and have found wide usage as windows for buildings, show cases, vehicles, refrigerators, and the like.

In fabricating all-glass multiple sheet glazing units according to one method, the two sheets of glass are supported in a horizontal position and in spaced apart relation, upon a so-called tray which carries the sheets through a furnace in which they are subjected to sufficient heat to cause the edge portions of the sheets to bend and fuse together to form a unitary structure. In fusing the sheets together, it has been found that it is somewhat difficult, in some cases, to form a seal having a uniform inner radius of curvature which is extremely desirable from the standpoint of strength and air and moisture tight characteristics inasmuch as it allows the sealed unit to be subjected to greater stresses without breaking the hermetic seal of the unit.

It is therefore a primary object of this invention to provide a multiple sheet glazing unit in which the inner portion or surface of the sealed edge has a substantially uniform radius.

Another object of the invention is to provide such a multiple sheet glazing unit of increased strength.

A further object of the invention is the employment of a low melting point glass which intermingles with and is integral with the sheet when they are fused together.

A still further object of the invention is to effect the strengthening of the unit by adding additional glass within the unit along the line of fusion or joinder of the edges of the two glass sheets.

Other objects and advantages of the invention will become more apparent during the course of the following description when taken in connection with the accompanying drawings.

In the drawings wherein like numerals are employed to designate like parts throughout the same:

Broadly stated, the present invention proposes to place a low melting point glass upon at least one of the glass sheets of an all-glass multiple sheet glazing unit inwardly of but parallel to its edges before the sheets are sealed together, so that, upon sealing of said sheets, the low melting point glass will fuse with the sheets adjacent the line of fusion thereof to increase the strength and the vapor-proof characteristic of the multiple sheet glazing unit so formed.

Figure 1:
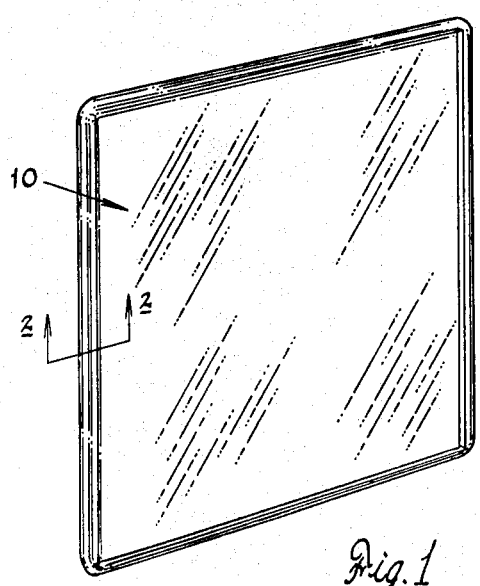
FIG. 1 is a perspective view of an all-glass multiple sheet glazing unit of the type with which the present invention is concerned.
Figure 2:
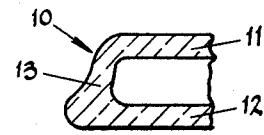
FIG. 2 is a fragmentary sectional view taken substantially along line 2—2 of FIG. 1.

With reference now to the drawings, there is shown in FIGS. 1 and 2 a multiple sheet glazing unit 10 produced in accordance with this invention. The glazing unit 10 comprises two sheets of glass 11 and 12 arranged in spaced face-to-face relation with respect to one another and having their marginal edge portions sealed or fused together as indicated at 13 to provide an hermetically sealed unit.

As pointed out previously, it is desirable when fusing the edges of the sheets 11 and 12 together to fill the area along the line of joinder of the two sheets with glass to increase the strength of the seal. Also, by filling in the area along the fusion line, an additional seal is formed which aids in producing an air and moisture tight bond between the respective sheets.

Figure 3:
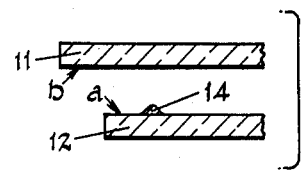
FIG. 3 is a fragmentary sectional view showing two spaced sheets of glass before they are sealed together according to the method of the invention.

To form this additional seal, according to the present invention, a small ridge or unused area 14 (FIG. 3) of a low melting point glass is placed around the upper marginal edge *a* of the lower sheet 12 previous to the fusing of the sheets together. This low melting point glass may be composed of glass frit or powder suspended in a water vehicle with a water soluble cellulose or other binder material that will help to maintain the powdered glass in suspension. A typical glass that may be used is the "Ground Glass Frit No. 2533" made by D. F. Drakenfeld & Company, 45–47 Park Place, New York, New York. However, regardless of the type of glass used, it should be pointed out that it is preferable that the glass have substantially the same coefficient of expansion as the glass of sheets 11 and 12, and this factor will have a bearing on the type of glass frit or powder used.

Figure 4:
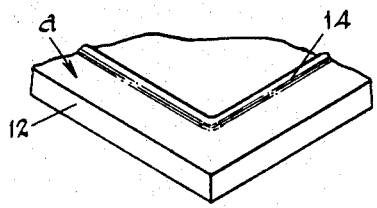
FIG. 4 is a fragmentary perspective view of the lower sheet of the unit showing a ridge formed of a powder-like low melting point glass deposited upon the upper surface of the sheet inwardly of the edges thereof.
Figure 5:
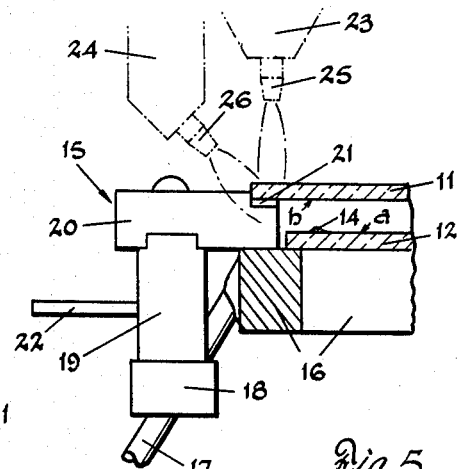
FIG. 5 is a transverse sectional view of an apparatus for supporting the sheets of the unit prior to and during the edge sealing thereof.

After the ridge 14 of glass frit or powder has been applied around the marginal portions *a* of the lower sheet 12 as shown in FIG. 4, the respective glass sheets 11 and 12 are supported one above the other in a horizontal position upon a so-called tray 15 (or other suitable apparatus) such as shown in FIG. 5, with sheet 11 which is slightly larger being supported above the smaller sheet 12. Thus, at each side of the spaced sheets the edge portions of the upper sheet 11 project slightly beyond the lower sheet 12.

The tray 15 on which the sheets are supported is described more fully in copending application Serial No. 300,884, filed July 25, 1952. However, for the purposes of this invention it includes an upper rim portion 16 supported by suitable struts 17. The said rim portion 16 conforms to the contour of the lower sheet 12, the edge portions of which are supported on the upper edge of said rim. Positioned adjacent the rim 16 and secured between the struts 17 are a plurality of bearings 18 having vertical pins 19 journaled therein. The pins 19 carry sheet supporting fingers 20 for supporting the upper glass sheet 11 as shown in FIG. 5.

Each of the fingers 20 is notched at its inner end as at 21 to form a ledge on which the marginal edge portions of the upper sheet 11 are supported in predetermined spaced relation to the lower sheet 12. Attached to the pins 19 below the sheet supporting fingers 20 are handles 22 which are adapted to swing the fingers out of sheet supporting position.

Thus, it will be seen that prior to the sealing of the glass sheets 11 and 12, the respective sheets are assembled in spaced face-to-face relation in which each sheet is supported at its edge portions upon the tray 15 and are arranged in superimposed relation. In sealing the sheets, the tray 15 is moved through a furnace (not shown) over a suitable conveyor means and is aligned with and moved past upper and lower burner elements 23 and 24 respectively disposed along one or both sides of the furnace.

For the purpose of causing flames to be impinged upon the edge portions of the glass sheets when aligned with and moved past the burner elements 23 and 24, the upper and lower burner elements are provided with rows of aligned nozzles 25 and 26 respectively. The upper row of nozzles 25 is arranged to direct flames therefrom along a straight line substantially onto the edge portions of the upper sheet 11, while the lower row 26 is arranged at an angle to the vertical so as to direct flames along the edge of the said upper sheet and toward the lower sheet 11 so as to cause the edge portions to bend into fusing contact with one another. As the glass sheets are conveyed past the burners, the handles 22 are progressively actuated by means, not shown, to swing the fingers 20 horizontally out of sheet supporting position so that the edge portions of the two sheets can fuse together.

As previously mentioned, the burner elements 23 and 24 may be disposed along one or both sides of the furnace. Thus, during movement of the tray 15 through said furnace, opposite edge portions of the assembled glass sheets 11 and 12 may be either sequentially or simultaneously sealed together. It will of course be understood that during the entire edge sealing operation, the sheets 11 and 12 are at all times maintained in properly spaced relation by either the finger members 20 or the edge portion of the unit just sealed.

Figures 6, 7:
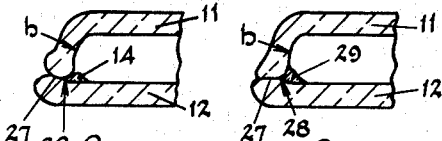
FIG. 6 is a fragmentary sectional view of the unit as the spaced glass are fused with one another.
FIG. 7 is a fragmentary sectional view of the unit during a further stage in the sealing process.

During the passage of the sheets past the burners 23 and 24, the ridge or raised area 14 formed of powdered glass or glass frit is heated to the fusing temperature thereof and the marginal edges $b$ of the upper sheet 11 and $a$ of the lower sheet 12 bend toward one another and fuse together along the ridge 14 on the lower sheet 12 as shown in FIG. 6. This initial fusing of the sheets 11 and 12 forms a fusion line indicated at 27 and results in a small groove or depression 28 on the inside of the sealed unit. However, according to the present invention, as the upper sheet bends downwardly and contacts the edge of the lower sheet, it also contacts the ridge 14 of powdered glass or glass frit. At this point, as the edges of the sheets 11 and 12 are at the fusing temperature of the glass, and since the glass frit of ridge 14 has also been heated to the fusion temperature thereof by the heat from the burners, there is a general fusing of the glass frit with the sheets 11 and 12 along the groove 28. Of course, since the edges of the sheets and the glass frit 14 are in a semifluid state, the low melting point glass 14 tends to flow into and fill the groove 28 and to spread out in fusing contact with the sheets 11 and 12 to form a fillet as indicated at 29 in FIG. 7.

As a result of this spreading flow of the low melting point glass, the inner portion of the sealed edge 13 has a substantially uniform radius as shown in FIG. 2 with the result that the seal of the unit is greatly improved both from the standpoint of strength and air and moisture resistance. This is brought about by the general intermingling of the low melting point glass and the edges of the glass sheets 11 and 12 which generally erases the fusion line 27 and groove 28 leaving the sheets and low melting point glass sealed together as an integral unit as shown in FIG. 2.

In this connection, it is to be pointed out that during the fusing of the glass frit or powder 14 to the glass sheets 11 and 12, the cellulose binder or other binder material that may be used to initially keep the frit or powder together will be burned out of the suspension and the water will be driven off leaving a substantially pure fillet of glass to fill the groove 28 and to blend with the sheets 11 and 12.

Figure 8:
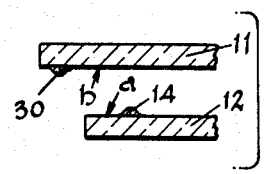
FIG. 8 is a fragmentary sectional view of spaced sheets of glass before they are sealed together showing an alternate form of the invention.

Alternatively, if a larger inner seal is desired, a second ridge of low melting point glass 30 may also be placed along the marginal edge portion $b$ of the upper sheet 11 as shown in FIG. 8. Upon sealing of the sheets together, the low melting point glass 30 on the upper sheet will supply an additional amount of glass to fill the fusion area and will blend with the low melting point glass 14 on sheet 11.

I claim:

1. A method of producing multiple sheet glazing units of a type having sheets of glass disposed in spaced face-to-face relationship with the marginal edge portions thereof fused together to provide a sealed chamber between the sheets, comprising placing a ridge of low melting point glass on one face of a first glass sheet spaced inwardly from the peripheral edges thereof, positioning a second sheet in spaced face-to-face relationship to said one face of said first sheet with the marginal edge portions overhanging said ridge, heating the marginal edge portions of said sheets to the fusion temperature of glass and bending the edge of said second sheet toward said first sheet and into fusion contact therewith outwardly of said ridge with the inner surface of said edge of said second sheet contacting said ridge whereby said low melting point glass will fuse to the sheets at the line of joinder therebetween.

2. A method of producing multiple sheet glazing units as defined in claim 1, wherein a second ridge of low melting point glass is placed on the inner face of said second glass sheet adjacent the edge thereof so as to contact said first ridge when the edges of said first and second sheets are in fusion contact.

3. A method of producing a multiple sheet glazing unit composed of two sheets of glass arranged in spaced face-to-face relationship and sealed together at their marginal edges to provide a sealed chamber therebetween, comprising supporting a first sheet of glass in a substantially horizontal plane, placing a ridge of low melting point glass on the upwardly directed surface of said first sheet of glass spaced inwardly of the edges of the glass sheet, supporting a second glass sheet above said first glass sheet in spaced face-to-face relationship therewith with the marginal edge portions overhanging said ridge, heating the marginal edge portions of said first and second sheets and bending the edge portion of said second sheet downwardly into fusion contact with said first sheet outwardly of said ridge with the inner surface of said edge portion of said second glass sheet in engagement with said ridge of low melting point glass, whereupon said marginal edge portions of said first and second glass sheets fuse with one another and said low melting point glass fuses to the edge portions of said first and second sheets at a line of joinder between the sheets.

References Cited by the Examiner
UNITED STATES PATENTS

| | | | |
|---|---|---|---|
| 2,145,351 | 1/1939 | Hazleton | 65—82 |
| 2,643,020 | 6/1953 | Dalton | 65—58 X |
| 2,736,075 | 3/1956 | Baker | 65—82 |
| 2,749,668 | 6/1956 | Chaffotte et al. | 65—58 X |

DONALL H. SYLVESTER, *Primary Examiner.*